3,362,937
PROCESS FOR CURING GOLF BALL COVER STOCK CONTAINING A THIO AMINE ACCELERATOR BY TREATMENT WITH HYDROGEN HALIDE
Eric George Kent, Sarnia, Ontario, Canada, assignor to Polymer Corporation Limited, Sarnia, Ontario, Canada, a body corporate and politic
No Drawing. Filed Oct. 18, 1965, Ser. No. 497,494
Claims priority, application Canada, Sept. 28, 1965, 941,573
7 Claims. (Cl. 260—79.5)

ABSTRACT OF THE DISCLOSURE

Golf ball covers prepared from crystalline polymers such as natural balata and polymers of $C_4$–$C_6$ conjugated diolefinic hydrocarbon compounds such as trans-polyisoprene, which have at least 75% trans-configuration in their molecular structures may be vulcanized at ambient temperatures by immersion for 5–200 hours in a solution of hydrochloric or hydrobromic acid when the cover stocks are compounded with 3–15 parts of a compound of the general formula

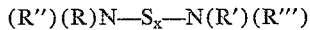

$$(R'')(R)N-S_x-N(R')(R''')$$

where $x$ is 1–4 and R and R' are hydrogen or organic radicals and R'' and R''' are organic radicals.

---

The present invention is concerned with improvements in or relating to processes for the manufacture of products, such as play balls, having a cover comprising a sulphur vulcanisable polymer. A particular example of such a product is golf balls.

The usual type of golf ball at present in use consists of a centre selected from the variety available, e.g. liquid, solid rubber, steel etc., wound with a tensioned rubber thread and enclosed in a hard moulded cover of a suitable polymer. The tensioned thread imparts the desired compression to the ball, the compression obtained being proportional to the tension, and may be wound in what is known as a great circle wind, which generally distributes the compression more evenly over the ball, or a random wind, which generally gives better adhesion of the cover to the resulting wound core, or a mixture of the two. The stock material from which the cover is moulded is prepared, pieces are cut approximately to size and are moulded to form separate hemispherical half shells in a cooled press. Each wound core is enclosed in two of these half shells and the ball is moulded to its final shape in a ball mould, the moulding cycle including heating followed by cooling under pressure. The resulting unvulcanised balls are removed from the mould and, because of the relatively expensive nature of the cover material, the flash is stripped for re-use. The cover is then vulcanised to the desired hard final condition by one of the many methods used hitherto. The cover is then bleached to assist in achieving a desired bright white paint finish and leached of any chemicals which might later migrate to the surface and cause problems after painting. The balls are then painted, stamped and packaged, and are usually thereafter available for sale, although with some vulcanisation processes an additional "shelf" cure of up to several months may be required.

Several problems are encountered in the process steps concerned particularly with the manufacture of the cover. Vulcanisation is essential to obtain the desired hardness, rigidity, and strength, and to cause the cover to adhere firmly to the enclosed wound core, and should be effected at as low a temperature as possible, to avoid excessive loss of these desirable properties, to provide an economically attractive process, and to avoid degradation, such as softening and consequent loss of tension of the threads of the wound core. The vulcanisation temperature could theoretically be reduced by incorporating accelerators in the cover material before moulding, but this would cause practical difficulties, including scorch or pre-vulcanisation of the material during compounding and handling before moulding, and short shelf life, with the result that the material moulds poorly or is incapable of moulding, will not adhere firmly to the wound core, and will not re-mould, so that the flash cannot be re-used. Such problems are particularly severe in the case of precipitated balata, and synthetic balatas such as transpolyisoprene, since these materials must be compounded at temperatures in excess of 60° C., preferably 75–85° C. and yet, to avoid the difficulties referred to above, should be vulcanised at temperatures not greater than about 55° C.

It is an object of the present invention to provide a new process for the manufacture of products, such as balls, having a cover comprising a sulphur vulcanisable polymer.

It is a more specific object to provide a new process for the manufacture of golf balls having a cover comprising a sulphur vulcanisable polymer, the process making use of a vulcanising agent which can be incorporated in the polymer before moulding and which will be substantially ineffective to cause vulcanisation under the conditions prior to and during the moulding and application of the cover, and can be rendered effective at any time subsequent to the moulding operation by subjecting the moulded cover to the action of a selected halogen acid at a low temperature.

In accordance with the present invention there is provided a process comprising forming a playball having a cover comprising a mixture of a solid sulfur-vulcanizable polymer and a compound having the general formula

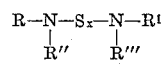

$$R-N-S_x-N-R'$$
$$\phantom{R-N-}|\phantom{S_x-}|$$
$$\phantom{R-N-}R''\phantom{S_x}R'''$$

where R and R' are hydrogen or organic radicals, R'' and R''' are organic radicals and $x$ is 1–4, and vulcanizing the cover by subjecting it to the action of a solution of a halogen acid selected from HCl and HBr in an inert liquid medium.

Broadly, the said cover-forming polymer may be any sulfur-vulcanizable polymer. In the case of the vulcanization of golf ball covers, to which this invention is more specifically directed, the best covers are based on natural balata or synthetic polymers of $C_4$–$C_6$ conjugated diolefinic hydrocarbon compounds, having at least 75% trans-configuration in their molecular structures. It is preferable to use polymers having at least 90% trans-configuration. As examples of the $C_4$–$C_6$ conjugated diolefinic hydrocarbon compounds from which the trans-polymers are prepared there may be mentioned butadiene-1,3, isoprene and chloroprene with isoprene being preferred. In order to modify the properties of the covers or for reasons of economy it may be desired to also incorporate other polymers into the compounds from which the covers are made. Suitable other polymers for this purpose include mixtures of the foregoing polymers with each other, natural rubber such as pale crepe, synthetic polymers such as rubbery or resinous copolymers of a butadiene-1,3 and styrene, a butadiene-1,3 and acrylonitrile, isoprene and isobutylene, high-cis polymers of $C_4$–$C_6$ conjugated diolefinic hydrocarbon compounds, unsaturated ethylene-propylene copolymers etc. It is most desirable that these polymers also be sulfur-vulcanizable. The amount of any of such other polymer incorporated into the cover compounds should always be in minor proportion to the high trans polymer and be limited so as to maintain the hardness of the vulcanized cover at a value higher than 65 as measured by the Shore C Durometer.

The properties of synthetic transpolyisoprene and precipitated balata are particularly well suited to the production of play balls, such as golf balls, that are subjected to very hard usage. The tensile strengths of the raw polymers is quite high at about 5000 p.s.i. or more with their elongations being about 500 or more. They are resistant to many chemicals, especially the chemicals present in the commonly used golf ball paints. At room temperatures a crystal structure is formed in the polymers which imparts the exhibited rigidity and strength to the raw polymers, the structure disappearing at relatively low temperatures i.e. about 55–70° C. so that the polymers flow readily and are easily formed at these temperatures, and quickly returning on cooling. When the polymers are vulcanised at low temperatures this crystal structure is partially retained and, although strength is lost, hardness is maintained and resistance to flow and to chemicals is improved, resulting in a heat-, flow- and solvent-resistant cover which maintains its hardness and "click." "Click" is a subjective attribute peculiar to golf balls, and is the sound emitted when the ball is properly hit; it should be neither too hollow nor too solid and is thought to be related to the hardness; its importance to the suitability of the ball for the game is not fully known and is believed to be mainly psychological.

The vulcanising agent is present preferably in the proportion from 3 to 15 parts and more preferably from 5 to 10 parts per 100 parts by weight of the vulcanisable material in the said mixture. The organic radicals in the general formula may be alkyl, aryl, alkyl aryl or cycloalkyl radicals and R and R'', or R' and R''' may together form part of a cyclic structure. The most preferred vulcanising agent is 4,4'-dithiobismorpholine, which is available commercially under the trade name Sulfasan R, and has the chemical structure:

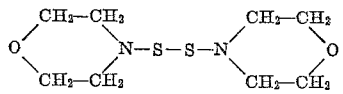

Other suitable vulcanising agents include N,N'-mono- and dithiobisdiethylamine, N,N'-dithiobispiperidine, N,N'-dithiobisbenzylamine, N,N'-dithiobispyrrolidine, N,N'-trithiobismorpholine and N,N'-tetrathiobismorpholine. The vulcanising agents in accordance with the invention are stable under the conditions encountered in the compounding of the mixture of the polymer, vulcanizing agent and other ingredients, and in the subsequent moulding operation, so that good moulding and adhesion to the wound core are readily achieved, and no pre-vulcanisation or scorch is apparent. Upon subjecting the cover to the action of a halogen acid such as hydrochloric acid and/or hydrobromic acid, at relatively low temperatures, the compounds release an active cross-linking agent for the polymer which is believed to be sulfur chloride ($S_2Cl_2$). After vulcanisation the article may be washed with water or mild alkali to remove as far as possible any soluble by-products of the reaction, although the amount of such washing that is required is usually found to be less than with many other prior vulcanisation processes, and in some processes in accordance with the invention washing may not be required.

An unexpected advantage of processes in accordance with the invention, as applied to articles such as golf balls, the covers of which are painted after the vulcanisation operation, is that much better adherence of the paint to the cover is obtained than with other vulcanising processes employed hitherto. It is at present believed that this may be due to a side reaction of the halogen acid, particularly hydrochloric acid, in chlorinating the polymer in addition to causing the vulcanisation.

The preferred form in which the halogen acid is employed in the process is as a concentrated solution in water, but solutions of lower concentration and solutions in other solvents, such as methanol and ethanol, may also be employed. It is an attractive commercial aspect of the invention that the vulcanisation process consists effectively of a simple soaking of the moulded balls in a stable relatively easily handled acid solution at low temperature. It is at present believed that the presence of a certain amount of moisture is desirable, to cause ionisation of the acid and, for example, the amount found in commercial grades of methanol is generally sufficient for this purpose. A suitable solution of hydrochloric acid may contain from 15 to 40 parts by weight of acid. The higher concentrations of acid in solution appear to give the best results e.g. 25–40% are therefore preferred. Such solutions are inherently stable and remain so under the conditions of the vulcanisation step.

The length of time for which the cover must be in contact with the halogen acid solution, and the temperature at which it is so subjected, are interrelated in the usual manner, that is, the time can be reduced with increasing temperature, and vice versa. The concentration of the acid in the solvent will also affect both time and temperature, both decreasing with increasing concentration. It is at present believed that the reaction between the vulcanising agent and the halogen acid is relatively rapid, so that the time and temperature are in practice dependent primarily upon the rate of diffusion of the acid into the cover. Consequently, these parameters are also affected by the thickness of the cover, or the thickness of the outer part of the cover that is required to be vulcanised to give a satisfactory article. In the case of a golf ball an upper limit is set to the temperature, because, as explained above, of the need to avoid degradation of the properties of the wound core. In the case of many of the synthetic balatas, such as transpolyisoprene, an upper limit is also set by the fact that the desired crystal structure begins to be lost at elevated temperatures, about 55° C. and above in the case of transpolyisoprene. The preferred temperature for the vulcanisation step is from 15–55° C. and more preferably 25–35° C. for periods of time from 5 to 200 hours and more preferably from 24 to 120 hours.

In the case of golf balls the thickness of the cover, or the vulcanised portion thereof, should be about 0.05–0.125 inch (0.13–0.32 cm.) but usually not more than 0.1 inch (0.25 cm.) The progress of the vulcanisation process is, in the case of transpolyisoprene, most conveniently determined by measurement of the solubility of the material in benzene, the vulcanised material being soluble and the vulcanised material insoluble, so that the solubility gives an indication of the number of percent of cross-linked chains. Preferably, the process is continued until the insoluble fraction comprises not less than 85% by weight, more preferably 90%, and particularly 93%, of the total polymer. The invention will be further understood by reference to the following examples:

*Example 1*

Four samples of an isoprene polymer characterised by a 98% trans-configuration in its molecular structure, an X-ray measured crystallinity of 30%, an ML-4–100° C. Mooney viscosity of 25, an intrinsic viscosity as measured in toluene at 30° C. of 2.7, a raw polymer tensile strength of 5520 p.s.i. and elongation of 550% at break, were each compounded at 70–75° C. with 10 parts by weight of Sulfasan R and various amounts of Titanox AMO (trademark for a titanium dioxide white pigment, filler and reinforcing agent) and Hi-Sil (trademark for a precipitated hydrated silica filler and reinforcing agent). Samples of each compound were set aside for tensile strength determination and the rest were formed into half-shells which were moulded onto wound golf ball cores. The golf balls and tensile strength test pieces were then immersed in a 37% aqueous solution of hydrochloric acid and allowed to cure at room temperature (about 25° C.) for various lengths of time. Tensile strengths were determined on the test pieces at 80° C. while various tests were made on the vulcanized balls at room temperature. A commercially available golf ball of the highest quality and having a Professional Golfers Association compression rating of 90 and the cover of which had been vulcanized by a non-acid method outside the scope of the present invention was used as a control. The balls prepared by the acid-curing method of the present invention had a PGA compression rating in the range of 82–85. The results are summarized in Table I. Although not included in the table, investigation showed that the penetration of the cover compound into the winding during the moulding step was as good as in the control ball in each case and the cover lifting encountered in the acid-cured golf balls when the covers were cut with a #9 iron, was equal to or less severe than that encountered in the control ball—thus indicating excellent vulcanization with the acid-curing process of the present invention.

In the table the parameters of Click and Cut Resistance are defined as follows:

*Click,* which has been described above and which at the present time is capable of only subjective evaluation.

*Cut Resistance.*—This is the ability of the cover to resist the cutting or shearing action of the golf club on impact with the ball and is of prime importance. An evaluation can be provided by subjecting the balls to a guillotine test in which an guillotine blade of predetermined weight and edge shape is allowed to fall on the ball, and the height of fall in inches to just cut through the ball cover is determined. In a practical test the effect of strokes with a #9 iron club is determined under standard conditions.

under pressure. A sheet from each compound was then subjected to the following vulcanising conditions in aqueous hydrochloric acid solutions:

(1) Control conditions of zero time and zero acid.
(2) 2 hours at 15° C. with 26.6% acid by weight.
(3) 4 hours at 15° C. with 26.6% acid by weight.
(4) 8 hours at 15° C. with 26.6% acid by weight.
(5) 16 hours at 15° C. with 28.4% acid by weight.

The results are summarized in Table 2.

Both gel percentage and swelling index (S.I.) are indicative of the amount of cross-linking that has taken place and therefore can be used to determine the progress of the vulcanization process.

TABLE 2

|  | A | B | C | D |
|---|---|---|---|---|
| Balata | 100 | 100 |  |  |
| Transpolyisoprene |  |  | 100 | 100 |
| Sulfasan R | 2.5 | 5.0 | 2.5 | 5.0 |
| Condition 1: |  |  |  |  |
| Percent Gel | 0.3 | 0.4 | 0.3 | 0.3 |
| S.I. | Completely dissolved |  |  |  |
| Condition 2: |  |  |  |  |
| Percent Gel | 55 | 45 | 48 | 41 |
| S.I. | 11 | 11 | 13 | 13 |
| Condition 3: |  |  |  |  |
| Percent Gel | 78 | 86 | 72 | 72 |
| S.I. | 9 | 7 | 10 | 8 |
| Condition 4: |  |  |  |  |
| Percent Gel | 86 | 86 | 70 | 81 |
| S.I. | 8 | 6 | 11 | 7 |
| Condition 5: |  |  |  |  |
| Percent Gel | 84 | 90 | 68 | 81 |
| S.I. | 8 | 6 | 11 | 7 |

The results show that insufficient vulcanization is obtained with 2.5 parts of vulcanising agent and that at least about 5 hours and preferably over 15 hours curing

TABLE 1

| Compound | 1 | 2 | 3 | 4 |
|---|---|---|---|---|
| Polymer | 100 | 100 | 100 | 100 |
| Sulfasan R | 10 | 10 | 10 | 10 |
| Titanox AMO | 10 |  | 10 |  |
| Hi-Sil | 10 | 10 |  |  |

| Compound | Cure Time (hrs.) | Tensile at 80° (p.s.i.) | Cut Resistance Guillotine Test | | Hardness Shore C | Rebound (percent) | Click |
|---|---|---|---|---|---|---|---|
|  |  |  | Inches | #9 Iron |  |  |  |
| Control ball |  | 215 | 10 | G | 74 | 73 | Excel. |
| 1 | 0 | 0 | 7 |  | 71 | 73 | Excel. |
|  | 5.5 | 50 | 10 | VG | 77 | 74 | Excel. |
|  | 24 | 135 | 10 | VG | 75 | 74 | Excel. |
|  | 42 | 290 | 10 | E | 75 | 71 | Excel. |
| 2 | 0 | 0 | 5 |  | 72 | 76 | Excel. |
|  | 5.5 | 51 | 8.5 | E | 77 | 74 | Excel. |
|  | 24 | 130 | 10 | VG | 77 | 74 | Excel. |
|  | 42 | 155 | 10 | E | 77 | 71 | Excel. |
| 3 | 0 | 0 | 8 |  | 71 | 73 | Good. |
|  | 5.5 | 35 | 8.5 | G | 77 | 74 | Do. |
|  | 24 | 140 | 10.75 | G | 77 | 71 | Do. |
|  | 42 | 295 | 10 | VG | 75 | 71 | Do. |
| 4 | 0 | 0 | 6.5 |  | 71 | 76 | Do. |
|  | 5.5 | 60 | 8.5 | VG | 77 | 74 | Do. |
|  | 24 | 160 | 10 | G | 77 | 74 | Do. |
|  | 42 | 175 | 10.25 | VG | 75 | 74 | Do. |

(G—good; VG—very good; E—Excellent.)

These results show that excellent golf balls can be prepared by acid-curing of the cover compounds at low temperatures and short cure times.

*Example 2*

Four compounds A, B, C and D were prepared, two of precipitated balata and two of transpolyisoprene, with corresponding amounts of Sulfasan R as vulcanising agents. Thin sheets were moulded in a press for three minutes at 250° F. and then cooled to room temperature time is desirable at 15° C. using about 27% acid concentration.

*Example 3*

Three balata compounds A, B and C were prepared including 3.0, 5.5 and 8.0 parts respectively of Sulfasan R vulcanising agent per 100 parts of balata. A disc of thickness 0.06 inch and diameter 7.0 inches was moulded from each compound using the procedure of Example 2. Vulcanisation in aqueous hydrochloric acid solutions was effected on strips measuring 0.5 inch by 3 inches cut from these discs, the conditions used being as follows:

(1) 2 hours at 25° C. and 26.6% acid.
(2) 4 hours at 25° C. and 26.6% acid.
(3) 8 hours at 25° C. and 23.1% acid.
(4) 16 hours at 25° C. and 23.1–22.2% acid.
(5) 24 hours at 25° C. and 21.0% acid.

P.s.i. means stress in pounds per square inch and was in all cases measured at 20% strain at 100° C.

TABLE 3

| Compound | A | B | C |
|---|---|---|---|
| Condition 1: | | | |
| P.s.i. | 0 | 1.43 | 2.31 |
| S.I. | 13 | 11 | 19 |
| Condition 2: | | | |
| P.s.i. | 1.81 | 1.88 | 3.38 |
| S.I. | 11 | 11 | 9 |
| Condition 3: | | | |
| P.s.i. | 2.38 | 3.12 | 3.74 |
| S.I. | 11 | 11 | 9 |
| Condition 4: | | | |
| P.s.i. | 3.59 | 4.32 | 5.43 |
| S.I. | 10 | 9 | 7 |
| Condition 5, p.s.i. | 4.58 | 5.2 | 6.4 |

These results show that as the concentration of the acid is reduced, longer cure times are necessary.

*Example 4*

Samples of the compounds of Example 3 were subjected to longer curing times in solutions of hydrochloric acid in methanol. A progressive decrease in acid concentration during reaction was noted. The conditions employed were as shown below—all at temperatures of 25° C. Only stress values in p.s.i. at 20% strain at 100° C. are given.

(1) 72 hours at 30.2–26.6% acid.
(2) 96 hours at 26.6–25.7% acid.
(3) 120 hours at 25.7–24.7% acid.
(4) 168 hours at 24.7–23.1% acid.

The results are given in Table 4.

TABLE 4

| Compound | A | B | C |
|---|---|---|---|
| Condition: | | | |
| 1 | 1.98 | 2.33 | 1.93 |
| 2 | 1.81 | 2.42 | 2.32 |
| 3 | | 2.70 | 2.50 |
| 4 | 1.78 | 2.89 | 3.15 |

It will be seen that vulcanization continues progressively at these longer times.

*Example 5*

The effect of different concentrations of hydrochloric acid in water was determined using Compounds A and C of Example 3 and the procedures of Example 3.
The results are shown in Table 5.

TABLE 5

| Compound | Cure Time (Hrs.) | Acid Strength (Percent) | Stress at 20% Strain | Percent Gel | S.I. |
|---|---|---|---|---|---|
| A | 2 | 17.75 | Nil | 11.3 | 13.9 |
| | | 30.2 | 3.7 | 24.5 | 10.4 |
| A | 4 | 17.75 | 0.9 | 12.7 | 13.8 |
| | | 30.2 | 5.8 | 35.2 | 13.7 |
| A | 8 | 17.75 | 1.78 | 16.6 | 11.2 |
| | | 30.2 | 7.4 | 44.5 | 9.3 |
| A | 16 | 17.75 | 2.61 | 13.5 | 12.5 |
| | | 30.2 | 12.9 | 60.2 | 7.8 |
| C | 48 | 37.0 | 28.3 | 72 | 5 |
| C | 139 | 37.0 | 50.6 | 89 | 5 |
| C | 192 | 37.0 | 57.3 | 96 | 4 |

The desirability of the more concentrated solutions is clearly shown.

*Example 6*

Golf ball cover stock compounds were prepared from the trans-polyisoprene polymer described in Example 1, by blending with natural rubber smoked sheet or a rubbery copolymer of butadiene-1,3 and styrene containing 23.5% copolymerized styrene and having a ML-4'-100° C. Mooney viscosity value of 52, and 10 parts each of Sulfasan R and titanium dioxide filler. Samples of each compound were formed into test pieces and set aside for physical properties determination and other samples were formed into half-shells which were moulded onto wound golf ball cores. The test pieces and golf balls were immersed into a 36% aqueous solution of hydrochloric acid and allowed to cure at 25° C. for 24, 45 and 64 hours. The golf balls were tested for hardness, rebound, click and compression, and the stress-strain properties of the test pieces were measured at 25° C. and 80° C. and the results are reduced in Table 7.

TABLE 6

| Compound | 1 | 2 | 3 |
|---|---|---|---|
| Transpolyisoprene | 100 | 80 | 80 |
| Smoked Sheet | | 20 | |
| Rubbery Copolymer | | | 20 |
| Sulfasan R | 10 | 10 | 10 |
| Titanox | 10 | 10 | 10 |

TALBE 7

| | Curing Time (hours) | | | |
|---|---|---|---|---|
| | 0 | 24 | 45 | 64 |
| Compound 1: | | | | |
| 100% Modulus (p.s.i.) at— | | | | |
| 25° C. | 960 | 975 | 1,020 | n.t. |
| 80° C. | 0 | 140 | 180 | n.t. |
| Elongation at break (percent) at— | | | | |
| 25° C. | 350 | 265 | 260 | n.t. |
| 80° C. | n.r. | 210 | 140 | n.t. |
| Rebound | 74.5 | n.t. | n.t. | 73 |
| Hardness (Shore C) | 76 | n.t. | n.t. | 76 |
| Click | E | n.t. | n.t. | E |
| PGA compression | 66 | n.t. | n.t. | 74 |
| Compound 2: | | | | |
| 100% Modulus (p.s.i.) at— | | | | |
| 25° C. | 680 | 710 | 765 | n.t. |
| 80° C. | 0 | 50 | 90 | n.t. |
| Elongation at break (percent) at— | | | | |
| 25° C. | 465 | 325 | 305 | n.t. |
| 80° C. | n.r. | 215 | 235 | n.t. |
| Rebound, percent | 73 | n.t. | n.t. | 73 |
| Hardness (Shore C) | 68 | n.t. | n.t. | 76 |
| Click | E | n.t. | n.t. | E |
| PGA compression | 55 | n.t. | n.t. | 74 |
| Compound 3: | | | | |
| 100% Modulus (p.s.i.) at— | | | | |
| 25° C. | 685 | 655 | 735 | n.t. |
| 80° C. | 0 | 105 | 110 | n.t. |
| Elongation at break (percent) at— | | | | |
| 25° C. | 290 | 275 | 260 | n.t. |
| 80° C. | n.r. | 150 | 150 | n.t. |
| Rebound (percent) | 71 | n.t. | n.t. | 72 |
| Hardness (Shore C) | 68 | n.t. | n.t. | 63 |
| Click | E | n.t. | n.t. | E |
| PGA compression | 84 | n.t. | n.t. | 72 |

(E—excellent in above table.)
(n.r.—no reading possible.)
(n.t.—not tested.)

PGA compression is a reading obtained in a golf ball tester representing a compression of a calibrated spring which under the load of 250 pounds is compressed 0.1 inch or 100 PGA compression units. The reading is used by the Professional Golfers Association (PGA) for rating the quality of golf balls. Thus, golf balls having a high resistance to compression and showing a PGA compression of about 75 and higher are rated as the high quality golf balls. Low rating is given to practice balls showing a PGA compression of about 30 and less.

Table 7 shows that blends of transpolyisoprene with smoked sheet and butadiene-styrene copolymer, respectively, can be successfully used for the preparation of golf ball covers. The data in the table also indicate that curing at 25° C. does not adversely affect the properties of wound golf ball cores as evidenced in the PGA compression values before and after curing.

The golf balls having covers made from compounds shown in Table 6 and HCl cured for 64 hours were also tested for mark and cut resistance. For this purpose the balls were half buried in loose sand, repeatedly driven into a golf net using the sharp edge of a #9 golf iron and checked for degree and severity of marking of the cover including cutting, lifting and tearing. A commercially available ball of the highest quality was treated in the same manner to serve as a comparison standard. The balls with the acid-cured covers appeared to be equivalent to the control ball in resistance to marking, cutting, lifting and tearing of the covers.

These results indicate that excellent results can be obtained by the acid-curing process of the present invention.

What is claimed is:

1. In a process for the manufacture of golf balls comprising, compounding 100 parts by weight of a sulfur vulcanizable polymer mixture containing a major proportion of a polymer selected from the group consisting of natural balata and crystalline polymers of $C_4$–$C_6$ conjugated diolefinic hydrocarbon compounds having at least 75% trans-configuration in its molecular structure, with 3–15 parts by weight of a vulcanizing agent having the general formula

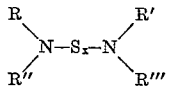

where R is selected from hydrogen, alkyl, aryl, alkylaryl, cycloalkyl radicals and a ring structure with R″, where R′ is selected from hydrogen, alkyl, aryl, alkylaryl, cycloalkyl radicals and a ring structure with R‴, where R″ is selected from alkyl, aryl, alkylaryl, cycloalkyl radicals and a ring structure with R, where R‴ is selected from alkyl, aryl, alkylaryl, cycloalkyl radicals and a ring structure with R′, and where $x$ is 1–4, and moulding a cover made of this compound on a golf ball core and vulcanizing it, the improvement which comprises vulcanizing said moulded cover by subjecting it at a temperature of about 15–55° C. to the action of a halogen acid selected from the group consisting of HCl and HBr in an inert liquid medium.

2. A process according to claim 1 where the vulcanizing agent is selected from the group consisting of N,N′ mono- and di-thiobisdiethylamine, N,N′ di-thiobispiperidine, N,N′ di-thiobisbenzylamine, N,N′ di-thiobispyrrolidine, and N,N′ di-, tri-, and tetra-thiobismorpholine.

3. A process according to claim 1 where the polymer is polyisoprene.

4. A process according to claim 2 where the vulcanizing agent is N,N′ di-thiobismorpholine.

5. A process according to claim 3 where the vulcanizing agent is N,N′ di-thiobismorpholine.

6. A process as claimed in claim 1 wherein the cover has a thickness of about 0.13–0.32 centimeter, the conjugated diolefinic hydrocarbon compound is isoprene, the compound defined by the said general formula is 4,4′-dithiobismorpholine and it is present in amounts of 3–15 parts per 100 parts of total sulfur-vulcanizable polymer in said mixture, the halogen acid is HCl, the inert liquid medium is selected from the group consisting of water, methanol, ethanol and mixtures thereof, the concentration of the acid in said medium is about 15–40 weight percent and the vulcanization is effected by immersion of the article in the liquid acid solution for 5–200 hours at a temperature of about 15–55° C.

7. A process as claimed in claim 6 wherein the inert liquid medium is water, the acid concentration in the water is 25–40 weight percent, the vulcanization temperature is 25–35° C., the vulcanization time is 24–120 hours and the 4,4′-dithiobismorpholine is present in amount of 5–10 parts by weight per 100 parts of total sulfur-vulcanizable polymer.

References Cited

UNITED STATES PATENTS

| | | | |
|---|---|---|---|
| 2,892,805 | 6/1959 | Tomlin et al. | 260—79.5 |
| 2,968,640 | 1/1961 | Gregg | 260—79.5 |
| 3,057,832 | 10/1962 | Brock | 260—79.5 |
| 3,166,609 | 1/1965 | Wilder | 260—894 |

FOREIGN PATENTS 650,959  11/1962  Canada.

MURRAY TILLMAN, Primary Examiner.

M. J. TULLY, Assistant Examiner.